Jan. 19, 1960  C. R. WILHELMSEN  2,922,033
REPETITIVE-LINEAR-SWEEP-SIGNAL GENERATOR
Filed April 9, 1954  2 Sheets-Sheet 2

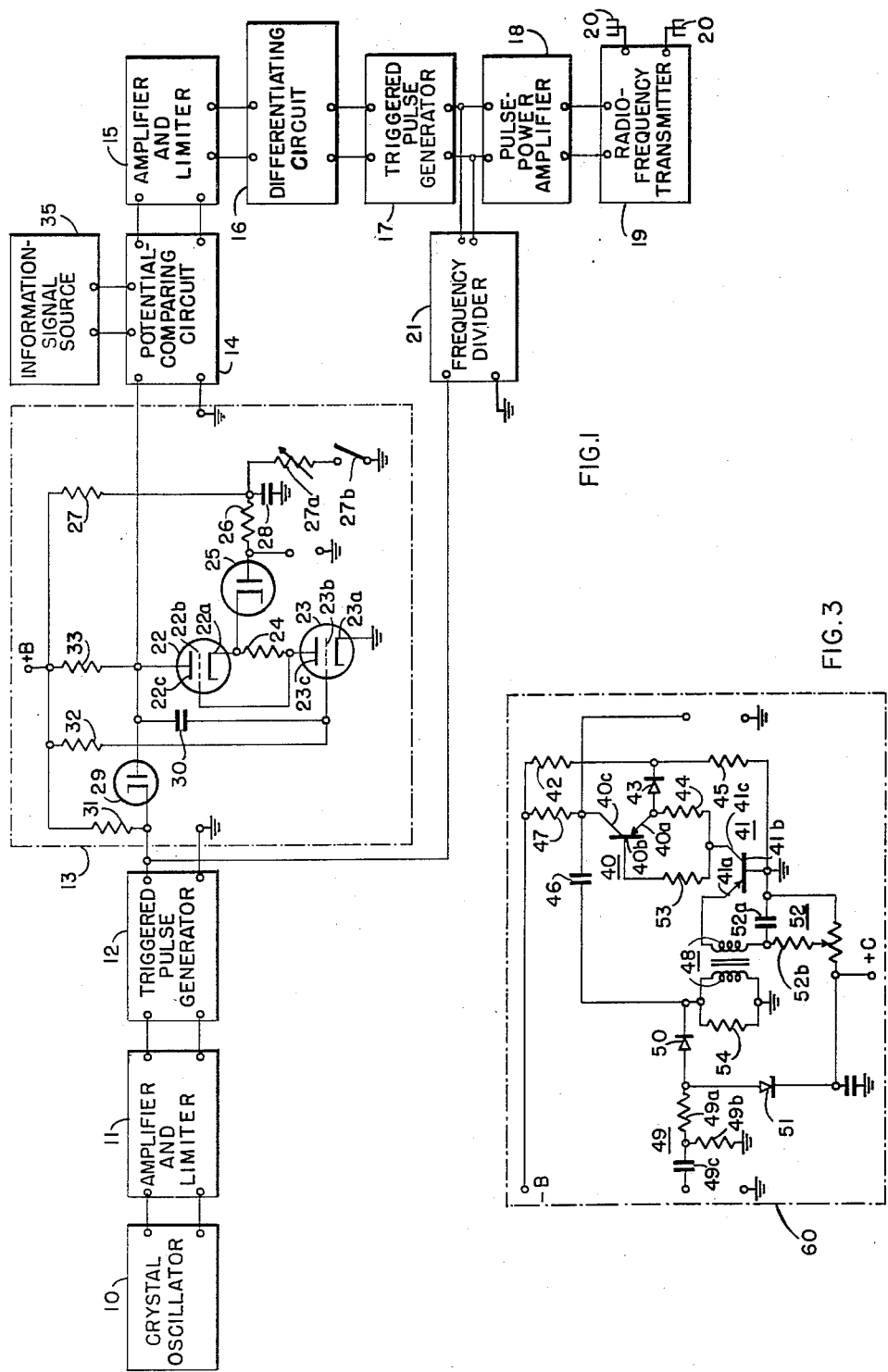

2,922,033
Patented Jan. 19, 1960

United States Patent Office

2,922,033
REPETITIVE-LINEAR-SWEEP-SIGNAL GENERATOR

Carl R. Wilhelmsen, Westbury, N.Y., assignor to Hazeltine Research, Inc., Chicago, Ill., a corporation of Illinois Application April 9, 1954, Serial No. 422,058

9 Claims. (Cl. 250—27)

General

This invention relates to repetitive-linear-sweep-signal generators and, more particularly, to such generators of the type which utilizes electron-discharge devices.

One type of linear-sweep-signal generator heretofore proposed, known as a phantastron generator, utilizes a five-electrode electron tube. Such a generator does not readily lend itself to substitution of a transistor for the electron tube since suitable transistor counterparts of a five-electrode tube are not commercially available at present. Moreover, the phantastron generator has the disadvantage that a single five-electrode tube having the proper current cutoff characteristics is relatively expensive.

It is an object of the present invention, therefore, to provide a new and improved repetitive-linear-sweep-signal generator which avoids one or more of the disadvantages and limitations of such generators previously proposed.

It is another object of the invention to provide a new and improved repetitive-linear-sweep-signal generator which does not require the use of a five-electrode electron-discharge device.

It is another object of the invention to provide a new and improved repetitive-linear-sweep-signal generator which is capable of utilizing commercially available three-electrode transistors.

In accordance with a particular form of the invention, a repetitive-linear-sweep-signal generator comprises first and second signal-responsive circuit means having variable-conductivity operating conditions and bias-circuit means coupled thereto for maintaining the first circuit means in a condition of low conductivity during high-conductivity intervals of the second circuit means. The generator also includes control-circuit means including the aforesaid bias-circuit means for repetitively increasing the conductivity of the first circuit means. The generator also includes circuit means coupled to the first and second circuit means for maintaining the second circuit means in a condition of low conductivity during intervals of increased conductivity of the first circuit means and responsive to the aforesaid increased conductivity for developing a substantially linear-sweep signal. Signal magnitude-limiting means is coupled to the first and second circuit means and is responsive to the sweep trace of the aforesaid sweep signal for limiting the sweep range of the sweep signal to restore the first and second circuit means to conditions of low and high conductivity, respectively.

For a better understanding of the present invention, together with other and further objects thereof, reference is had to the following description taken in connection with the accompanying drawings, and its scope will be pointed out in the appended claims.

Referring to the drawings:

Fig. 1 is a circuit diagram, partly schematic, of a transmitting channel of telemetering equipment including a repetitive-linear-sweep-signal generator constructed in accordance with the invention and utilizing electron tubes;

Fig. 3 is a detailed circuit diagram of a generator constructed in accordance with the invention and utilizing transistors.

Description of Fig. 1 telemetering equipment

Figure 4:
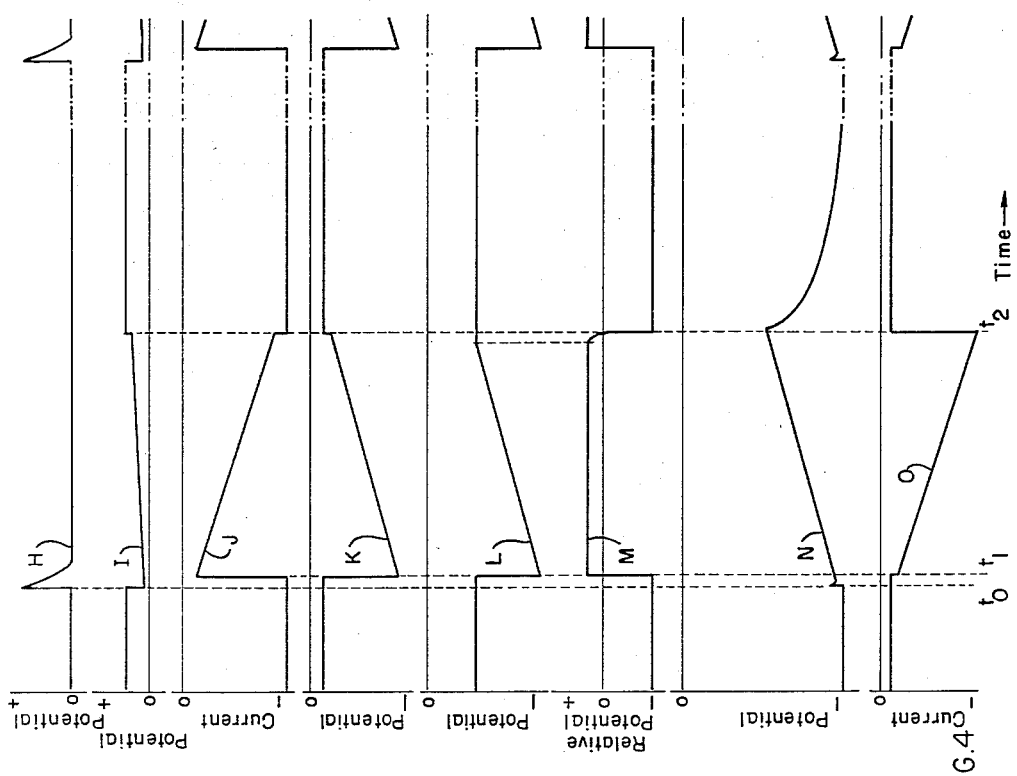
Fig. 4 is a graph representing signals at various points of the Fig. 3 generator and utilized in explaining the operation thereof.

Referring now to Fig. 1 of the drawings, there is represented a transmitting channel of telemetering equipment including a crystal oscillator 10, an amplifier and limiter 11, and a triggered pulse generator 12, for example, of the blocking oscillator type. These units are coupled in the order named for developing precisely timed periodic pulses and may be of conventional construction.

The output circuit of the triggered pulse generator 12 is coupled to a repetitive-linear-sweep-signal generator 13 constructed in accordance with the invention and described in detail hereinafter. The generator 13 is coupled to one input circuit of a potential-comparing circuit 14 of conventional construction, while an information-signal source 35, which may, for example, comprise a measuring device such as a strain gauge of an electrical type, is coupled to another input circuit of the potential-comparing circuit 14 for supplying a potential thereto for comparison with the linear-sweep output signal of the generator 13.

The potential-comparing circuit 14 is coupled through an amplifier and limiter 15 and differentiating circuit 16 of conventional construction to a triggered pulse generator 17, which may be of a conventional blocking oscillator type, for developing an output pulse representative of the time when the output signal of the generator 13 and the information signal from the source 35 have equal magnitudes.

The triggered pulse generator 17 is coupled through a conventional pulse-power amplifier 18 to a keying-pulse input circuit of a radio-frequency transmitter 19 for developing discrete bursts of radio-frequency energy representative of the keying pulses applied thereto. A conventional antenna system 20, 20 is connected to the output circuit of the transmitter 19 for radiating the radio-frequency energy.

The output circuit of the triggered pulse generator 12 is also coupled through a frequency divider 21 of, for example, a conventional pulse-counting or blocking oscillator type for developing periodic output synchronizing pulses. The frequency divider 21 is coupled to the input circuit of the pulse-power amplifier 18 for applying the synchronizing pulses thereto.

Operation of Fig. 1 telemetering equipment

Considering now the operation of the Fig. 1 telemetering equipment as a whole, the crystal oscillator 10 develops a sinusoidal output signal of crystal-controlled frequency which is applied to the amplifier and limiter 11 for suitable wave shaping. The amplifier and limiter 11 derives a periodic signal of rectangular wave form from the sinusoidal signal applied thereto and applies the derived signal to the triggered pulse generator 12 which develops an output pulse in response to each leading edge of the rectangular signal applied thereto.

The triggered pulse generator 12 applies the periodic output pulses thereof to the input circuit of the repetitive-linear-sweep-signal generator 13 which operates in a manner more fully described hereinafter to develop a substantially linear-sweep signal which is applied to the potential-comparing circuit 14. The information-signal source 35 applies a signal representing the information to be transmitted to the potential-comparing circuit 14 which develops an output signal representing the time when the linear-sweep signal supplied by the generator 13 and the signal supplied by the source 35 have substantially equal magnitudes. The output signal of the potential-comparing circuit 14 is amplified and limited and then differentiated in a conventional manner by units 15 and 16, respectively, to develop a pulse representing the time when the signal supplied by units 13 and 35 have substantially equal magnitudes.

The output pulses of the differentiating circuit 16 repetitively trigger the pulse generator 17 which develops output pulses suitable for keying the transmitter 19 after amplification by the pulse-power amplifier 18. In response to the keying pulses, the transmitter 19 develops periodic bursts of radio-frequency energy which represent the information to be transmitted and are applied to the antenna system 20, 20 for radiation.

The output pulses of the triggered pulse generator 12 are also applied to a frequency divider 21 which derives therefrom periodic synchronizing pulses of a suitable repetition frequency. The frequency divider 21 supplies the synchronizing pulses to the pulse-power amplifier 18 wherein they are amplified and then applied to the radio-frequency transmitter for periodically causing the transmitter to develop radio-frequency pulses interlaced with the pulses representing the information to be transmitted.

*Description of Fig. 1 linear-sweep-signal generator*

Referring now more particularly to the repetitive-linear-sweep-signal generator 13 of Fig. 1 constructed in accordance with the invention, the generator 13 comprises first and second signal-responsive circuit means having variable-conductivity operating conditions. More particularly, the first and second circuit means preferably comprise first and second series-connected electron-discharge devices, for example, electron tubes 22 and 23, respectively, each having three electrodes comprising input and output electrodes. Specifically, cathode 22a and control electrode 22b and cathode 23a and control electrode 23b of the tubes 22 and 23, respectively, serve as input electrodes, while the cathode 22a and anode 22c of the tube 22 and the cathode 23a and anode 23c of the tube 23 serve as output electrodes for the respective tubes.

There is provided bias-circuit means coupled to the first and second signal-responsive circuit means 22 and 23 for maintaining the first circuit means 22 in a condition of low conductivity during high-conductivity intervals of the second circuit means 23. This bias-circuit means preferably comprises a potential divider including a portion coupled in series with the first and second circuit means 22, 23. The potential divider includes the tube 23, a resistor 24 coupled to an output electrode, for example, the anode 23c of the tube 23, and to the input electrodes, for example, the control electrode and cathode of the tube 22. The potential divider also includes a diode 25, and series-coupled resistors 26 and 27 connected to a source of positive potential +B. A filter condenser 28 is connected to the junction of the resistors 26 and 27 and the time constant of the resistor-condenser network 26, 28 preferably is of a greater order of magnitude than the repetition period of the pulses supplied by the pulse generator 12 to maintain the junction potential substantially constant. An adjustable resistor 27a may be connected across the condenser 28 by means of a switch 27b, for reasons explained subsequently.

The generator further includes control-circuit means including the aforesaid bias-circuit means 23—28, inclusive, for repetitively increasing the conductivity of the first circuit means 22. This control-circuit means comprises, for example, a repetitive-trigger-pulse-supply circuit including a diode 29, resistor 31 connected between the cathode of the diode and the source +B, coupling condenser 30 and a grid-leak resistor 32 connected between the output circuit of the triggered pulse generator 12 and the control electrode and cathode of the tube 23 for repetitively triggering the first circuit means 22 to increase the conductivity thereof.

The generator also includes circuit means coupled to the first and second circuit means 22 and 23 for maintaining the second circuit means 23 in a condition of low conductivity during intervals of increased conductivity of the first circuit means 22. This circuit means is preferably coupled to an output electrode 22c of the first tube 22 and to the input electrodes 23a, 23b of the second tube 23 and includes, for example, the condenser 30, and grid-leak resistor 32 responsive as a time-constant network to the increased conductivity of the tube 22 for developing a substantially linear-sweep signal by, for example, controlling the conductivity of the tube 23 to maintain a substantially constant current flow through the condenser 30. A load resistor 33 is coupled to the anode of the tube 22.

There is also provided signal-magnitude limiting means coupled to the first and second circuit means 22 and 23 and responsive to the sweep signal for limiting the sweep range of the sweep signal to restore the first and second circuit means to conditions of low and high conductivity, respectively. More particularly, the signal-magnitude limiting means preferably comprises the diode 25 coupled to the cathode of the tube 22 and the anode of the tube 23 and maintained conductive by the bias-circuit means during the high-conductivity intervals of the tube 23 but maintained nonconductive by the bias-circuit means and the tube 22 during low-conductivity intervals of the tube 23.

*Operation of Fig. 1 linear-sweep-signal generator*

Considering now the operation of the generator 13, during one operating phase thereof current flows from the source +B through the potential divider comprising resistors 26, 27, tube 25, resistor 24, and tube 23. The current flow through the resistor 24 develops a potential drop thereacross sufficient to maintain the tube 22 nonconductive. During this operating phase, the diode 29 is on the verge of conducting since both its anode and cathode are at a potential +B supplied thereto through resistors 33 and 31, respectively.

Figure 2:
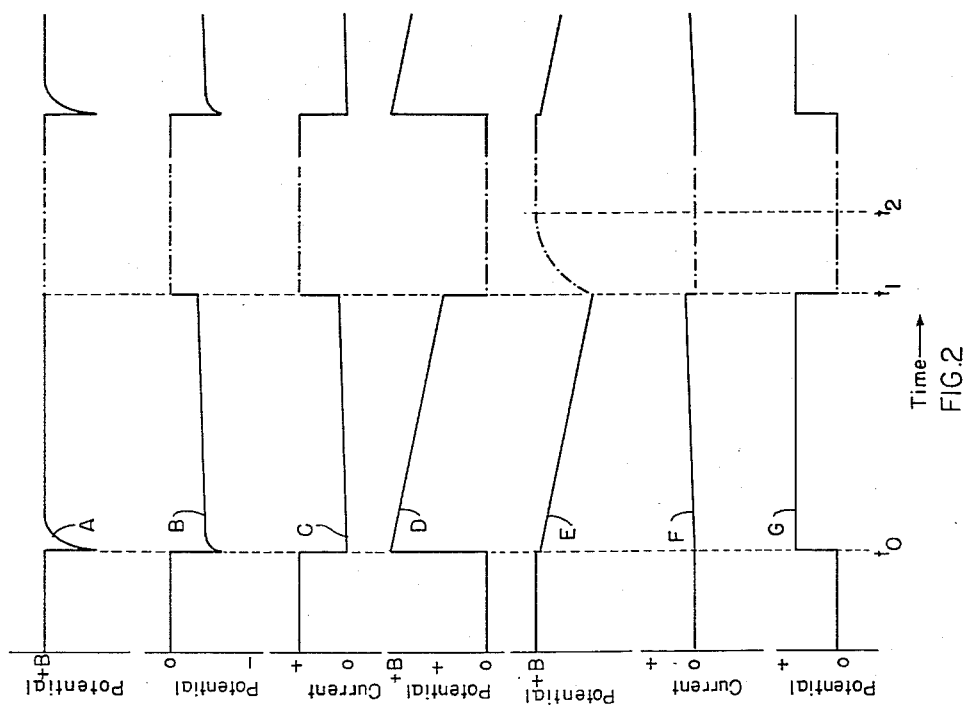
Fig. 2 is a graph representing signals at various points of the Fig. 1 generator and utilized in explaining the operation thereof.

When the triggered pulse generator 12 supplies negative trigger pulses, such as that occurring at the time $t_0$ and represented by curve A of Fig. 2, the diode 29 conducts, applying the trigger pulse to the control electrode of the tube 23 through the condenser 30. This pulse renders the tube almost nonconductive by driving the control electrode 23b, in the manner represented by curve B of Fig. 2, to a potential which allows, for example, a few microamperes of current to flow through the tube 23.

When the tube 23 becomes almost nonconductive, current flow through the resistor 24, represented by curve C, is substantially reduced, thereby rendering the tube 22 conductive. Because of the high impedance of the tube 23 relative to the impedance of the resistors 24 and 33 and the tube 22 in this operating phase, the potential at the anode of the tube 23 rises almost to the source potential +B, as indicated by curve D of Fig. 2 which is drawn to a reduced potential scale relative to curves A and B. At the same time $t_0$, a small value of current flow through the resistor 33 causes a slight potential drop thereacross, as indicated by the leading step of curve E which represents the anode potential of the tube 22 and is drawn to the same scale as curve D. The step of curve E and the corresponding difference between the peak of curve D and the potential +B are exaggerated in the drawing for the sake of clarity.

The current through tube 22, represented by curve F, flows from the source +B through resistor 32 and condenser 30 in parallel with the resistor 33. The current flow through the condenser 30 remains nearly constant because any variation thereof alters the control-electrode potential of the tube 23 and thus causes the impedance of the tube 23 to vary in a manner which compensates for the current variation. Since a nearly constant current flows through the condenser 30, the potential across the condenser decreases in a substantially linear manner at a rate determined by the time constant of the resistor-condenser network 32, 30, the source of potential +B, and the operating bias of the tube 23. The anode and cathode potentials of the tube 22 drop accordingly, as indicated by curves E and D, respectively.

In order for the anode potential of the tube 22 to fall in a substantially linear manner, the current flow through the tubes 22 and 23 must increase slightly to maintain a substantially constant current flow through the condenser 30 and a linearly increasing current flow through the resistor 33. Curves C and F represent the increase in current flow through the tubes 23 and 22, respectively, during the time interval $t_0$—$t_1$ in an exaggerated manner for the sake of clarity.

It is necessary that a small decrease in current flow through the condenser 30 and the resistor 32 must occur to allow the control-electrode potential of the tube 23 to rise slightly during the time interval $t_0$—$t_1$ and thus to allow an increasing current, represented by curve F, to flow through the tube 22. The decrease in current flow through the condenser 30 during the time interval $t_0$—$t_1$ is so slight however that a substantially linear-sweep signal is developed at the anode of the tube 22, as represented by curve E.

At the time $t_1$, the anode potential of the tube 22, represented by curve E, and the cathode potential thereof, which is substantially equal to the anode potential of the tube 22 during the sweep interval $t_0$—$t_1$, have dropped below the average potential maintained at the junction of the resistors 26, 27 and the condenser 28. Accordingly, at the time $t_1$, the diode 25 becomes conductive and current flows from the source +B through the resistors 27, 26, the diode 25, the resistor 24, and tube 23. The tube 22 then becomes nonconductive because of current flow through the resistor 24 and the anode of the tube 22 rises toward the potential +B at a rate determined by the potential +B and charge time constant of the resistor-condenser network 32, 30, 33 and the control electrode-cathode resistance of the tube 23, as indicated to a reduced time scale by the broken-line portion of curve E of Fig. 2. The circuit then remains in this operating condition until the next trigger pulse is supplied by the generator 12.

For some applications, it may be desirable that the linear-sweep-signal generator 13 operate as a free-running generator. Such free-running operation may be accomplished by reducing the value of the resistor 24 and thus reducing the maximum bias developed thereacross during high-conductivity intervals of the tube 23. The resistor 24 may then be so proportioned that during the charge time interval of the condenser 30, such as the interval $t_1$—$t_2$ of Fig. 2, the anode potential of the tube 22, represented by curve E, rises to a value sufficient to render the tube 22 conductive. The sweep signal is otherwise developed in a manner similar to that previously explained.

In other applications, the potential developed across the resistor 26 may be utilized as a gating signal synchronized with the sweep signal. This signal is of substantially rectangular wave shape, as represented by curve G, because the current flow through the resistor 26 rapidly changes from a predetermined value during conductive intervals of the diode 25 to zero value during nonconductive intervals of the tube 25.

The duration of the time interval $t_0$—$t_1$, during which the linear-sweep portion of the signal represented by curve E is developed, may be controlled by, for example, varying the potential at the junction of the resistors 27 and 26 by adjusting resistor 27a which may be connected across the condenser 28 through switch 27b. Adjustment of the resistor 27a alters the potential at the junction of the resistors 26 and 27, and thus, controls the potential at which the diode 25 becomes conductive to terminate the linear-sweep portion of the signal represented by curve E. Also, the cathode potential of the diode 29 may be adjusted by similar means (not shown) to control the duration of the sweep signal by varying the anode potential of the tube 22.

While applicant does not wish to be limited to any particular circuit constants, the following approximate circuit values have been employed in a generator of the type represented in Fig. 1 and constructed in accordance with the invention:

| | |
|---|---|
| Tubes 22 and 23 | Type 12AT7. |
| Tubes 25 and 29 | Type 6AL5. |
| Resistors 32 and 33 | 1 megohm. |
| Resistor 24 | 1.1 kilohms. |
| Resistor 26 | 4.7 kilohms. |
| Resistor 27 | 5.6 kilohms. |
| Resistor 31 | 100 kilohms. |
| Condenser 30 | 470 micromicrofarads. |
| Condenser 28 | 2 microfarads. |

*Description of Fig. 3 linear-sweep-signal generator*

Referring now more particularly to Fig. 3, there is represented a generator constructed in accordance with the invention and similar to the Fig. 1 generator but utilizing first and second transistors 40 and 41 comprising, for example, n-type semiconductors and having emitters 40a, 41a, bases 40b, 41b, and collectors 40c, 41c, respectively. Potential-divider bias-circuit means comprising resistors 42 and 45, a contact diode 43, a resistor 44, and the collector-base impedance of the transistor 41 is coupled to the collector 41c of the second transistor 41 and to the emitter 40a and through a resistor 53 to the base 40b of the first transistor 40 for maintaining the first transistor in a condition of low conductivity during high-conductivity intervals of the second transistor 41. Circuit means comprising, for example, a collector load resistor 47 and a condenser 46 is coupled through a pulse transformer 48 to the emitter and base of the second transistor 41 for maintaining the second transistor in a condition of low conductivity during intervals of increased conductivity of the first transistor 40. A parasitic-oscillation damping resistor 54 is connected across the transformer primary winding.

A suitable trigger-pulse-supply circuit including a resistor-condenser coupling network 49 is coupled to the primary winding of the transformer 48 through a contact diode 50 for applying positive trigger pulses thereto. A contact diode limiter 51 is coupled across the supply circuit for limiting the amplitude of the input pulses to a predetermined value to provide uniform circuit operation.

An adjustable resistor-condenser network 52 coupled to a source of bias potential +C is coupled to the emitter and base of the transistor 41 for applying a suitable operating bias potential thereto while a source —B is provided to supply energizing potentials for the transistor collector electrodes.

*Operation of Fig. 3 linear-sweep-signal generator*

The operation of the Fig. 3 generator 60 is generally analogous to the operation of the Fig. 1 generator 13. During one operating phase thereof, current flows from the emitter and base circuits of the transistor 41 through the resistor 44, the diode 43, and resistor 42 to the source —B, maintaining the transistor 40 in a condition of low conductivity. When positive trigger pulses, such as that occurring at time $t_0$ and represented by curve H of Fig. 4, are applied to the generator 60 through the network 49 and the diode 50 to the primary winding of the transformer 48, the transformer develops in the secondary winding thereof corresponding pulses of opposite polarity. Accordingly, at the time $t_0$ a pulse is applied to the emitter-base circuit of the transistor 41 which drives the emitter in a negative sense to the base, as represented by curve I of Fig. 4 which is drawn to an exaggerated potential scale.

After a slight delay interval $t_0$—$t_1$ which is believed to be due to a hole storage effect of the transistor 41, the collector current of the transistor 41 then decreases, as represented by curve J of Fig. 4, reducing the potential drop across the resistor 44 and allowing the transistor 40 to operate with increased conductivity. At the time $t_1$, the potential of the collector 41c of the transistor 41 becomes more negative, as represented by curve K, and the potential of the emitter 40a of the transistor 40 varies in a similar manner, represented by curve L, because of the increased base-collector impedance of the transistor 41.

The emitter-to-base potential of the transistor 40 is represented by curve M which is drawn to an exaggerated potential scale. At the time $t_1$, the emitter becomes positive relative to the base because a greater portion of the collector curent of the transistor 40 flows through the base-collector circuit and a lesser portion flows through the emitter-collector circuit. At the time $t_0$, the collector potential of the transistor 40, represented by curve N, becomes slightly less negative because a portion of the input pulse represented by curve H is applied to the collector 40c through various paths, such as through the condenser 46.

At the time $t_1$, the condenser 46 commences a discharge through the primary winding of the transformer 48, the collector-base impedance of the transistor 41, the resistors 44 and 53, and the transistor 40. During this operating phase, the collector-base impedance of the transistor 41, because of its relatively high value, exerts a dominant control over the discharge time of the condenser 46. During the discharge of the condenser 46, the current flow therethrough remains substantially constant because any variation of current flow develops a signal in the emitter-base input circuit of the transistor 41 which alters the collector-base impedance thereof in a manner to compensate for the current variation. Accordingly, the potential difference across the condenser decreases substantially linearly and the collector potential of the transistor 40 varies in the manner represented by curve N. A small reduction of current flow through the condenser 46 is necessary, however, to allow an increasing current to flow through the resistor 47. The total collector current of the transistor 40 is represented by curve O of Fig. 4.

When the collector potential of the transistor 40, represented by curve N, and the emitter potential thereof, represented by curve L, rise sufficiently to render the diode 43 conductive, an increased value of current flows through the resistor 44, causing a reduction of current flow through the transistor 40 represented by curve O at time $t_2$. The condenser 46 then begins to charge through the primary winding of the transformer 48 and the resistor 47, driving the emitter 41a of the transistor 41 in a positive sense with respect to the base thereof and causing a sharp increase in collector current as represented by curve J at the time $t_2$. The collector potential of the transistor 41, represented by curve K, then rapidly becomes less negative while the emitter potential of the transistor 40, represented by curve L, is clamped to the potential between the resistors 42 and 45 by the diode 43. The generator 60 then remains in the resulting stable operating condition until the application of the next trigger pulse thereto. The collector potential of the transistor 40 may be utilized as an output signal.

While applicant does not wish to be limited to any particular circuit constants, the following approximate circuit values are suitable for use in a generator represented by Fig. 3 and constructed in accordance with the invention:

| | |
|---|---|
| Transistors 40 and 41 | Type 1698 (Western Electric). |
| Contact diodes 43, 50, and 51 | Type 1N69. |
| Resistor 42 | 4.7 kilohms. |
| Resistor 45 | 1 kilohm. |
| Resistor 44 | 2 kilohms. |
| Resistor 53 | 2 kilohms. |
| Resistor 47 | 20 kilohms. |
| Resistor 54 | 5.6 kilohms. |
| Resistor 49a | 500 ohms. |
| Resistor 49b | 2 kilohms. |
| Resistor 52b | 2 kilohms. |
| Condenser 49c | .07 microfarad. |
| Condenser 46 | 1000 micromicrofarads. |
| Condenser 52a | 1 microfarad. |
| Primary - secondary step - down turns ratio of transformer 48 | 4:1. |
| Potential source +C | +10 volts. |
| Potential source —B | —90 volts. |

From the foregoing description, it will be apparent that a repetitive-linear-sweep-signal generator constructed in accordance with the invention has the advantage of being capable of utilizing commercially available three-electrode transistors. Further, the generator is capable of also supplying a signal of substantially rectangular shape for gating purposes. The duration of both the sweep signal and the gating signal may be varied, if desired, and the generator is suitable for time-modulation applications.

The term "electron-discharge device" as used in the claims is intended to include, for example, a vacuum tube or a transistor.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A repetitive-linear-sweep-signal generator comprising: first and second series-coupled electron-discharge devices having variable-conductivity operating conditions and each having three electrodes comprising input and output electrodes; potential-divider bias-circuit means including a portion coupled in series with said devices and to said input electrodes of said first device for maintaining said first device in a condition of low conductivity during high-conductivity intervals of said second device; a repetitive-trigger-pulse-supply circuit including said bias-circuit means for repetitively triggering said first device to increase the conductivity thereof; circuit means including a condenser coupled to an output electrode of said first device and to said input electrodes of said second device for maintaining said second device in a condition of low conductivity during intervals of increased conductivity of said first device and responsive to said increased conductivity for controlling the conductivity of said second device to maintain a substantially constant current flow through said condenser and thus to develop a substantially linear-sweep signal thereacross; and a signal-magnitude-limiting diode included in said bias-circuit means and maintained conductive thereby during said high-conductivity intervals of said second device but maintained nonconductive by said bias-circuit means and said first device during said low-conductivity intervals of said second device and responsive to the sweep trace of said sweep signal for limiting the sweep range of said sweep signal to restore said first and second devices to conditions of low and high conductivity, respectively.

2. A repetitive-linear-sweep-signal generator comprising: first and second signal-responsive circuit means having variable-conductivity operating conditions; bias-circuit means coupled thereto for maintaining said first circuit means in a condition of low conductivity during high-conductivity intervals of said second circuit means; control-circuit means including said bias-circuit means for repetitively increasing the conductivity of said first circuit means; circuit means coupled to said first and second circuit means for maintaining said second circuit means in a condition of low conductivity during intervals of increased conductivity of said first circuit means and responsive to said increased conductivity for developing a substantially linear-sweep signal; and signal-magnitude-limiting means coupled to said first and second circuit means and responsive to the sweep trace of said sweep signal for limiting the sweep range of said sweep signal to restore said first and second circuit means to conditions of low and high conductivity, respectively.

3. A repetitive-linear-sweep-signal generator comprising: first and second electron-discharge devices having variable-conductivity operating conditions and each having three electrodes comprising input and output electrodes; bias-circuit means coupled to an output electrode of said second device and to said input electrodes of said first device for maintaining said first device in a condition of low conductivity during high-conductivity intervals of said second device; control-circuit means including said bias-circuit means for repetitively increasing the conductivity of said first device; circuit means coupled to an output electrode of said first device and to said input electrodes of said second device for maintaining said second device in a condition of low conductivity during intervals of increased conductivity of said first device and responsive to said increased conductivity for developing a substantially linear-sweep signal; and signal-magnitude-limiting means coupled to an input electrode of said first device and to an output electrode of said second device and responsive to the sweep trace of said sweep signal for limiting the sweep range of said sweep signal to restore said first and second devices to conditions of low and high conductivity, respectively.

4. A repetitive-linear-sweep-signal generator comprising: first and second transistors having variable-conductivity operating conditions and each having an emitter, a base, and a collector; bias-circuit means coupled to said collector of said second transistor and to said emitter and base of said first transistor for maintaining said first transistor in a condition of low conductivity during high-conductivity intervals of said second transistor; control-circuit means including said bias-circuit means for repetitively increasing the conductivity of said first transistor; circuit means coupled to said collector of said first transistor and to said emitter and base of said second transistor for maintaining said second transistor in a condition of low conductivity during intervals of increased conductivity of said first transistor and responsive to said increased conductivity for developing a substantially linear-sweep signal; and signal-magnitude-limiting means coupled to said emitter of said first transistor and to said collector of said second transistor and responsive to said sweep signal for limiting the sweep range of said sweep signal to restore said first and second transistors to conditions of low and high conductivity, respectively.

5. A repetitive-linear-sweep-signal generator comprising: first and second transistors having variable-conductivity operating conditions and each having an emitter, a base, and a collector; bias-circuit means coupled to said collector of said second transistor and to said emitter and base of said first transistor for maintaining said first transistor in a condition of low conductivity during high-conductivity intervals of said second transistor; control-circuit means including said bias-circuit means for repetitively increasing the conductivity of said first transistor; time-constant circuit means including the base-collector impedance of said second transistor and coupled to said collector of said first transistor and to said emitter and base of said second transistor for maintaining said second transistor in a condition of low conductivity during intervals of increased conductivity of said first transistor and responsive to said increased conductivity for developing a substantially linear-sweep signal; and signal-magnitude-limiting means coupled to said emitter of said first transistor and to said collector of said second transistor and responsive to said sweep signal for limiting the sweep range of said sweep signal to restore said first and second transistors to conditions of low and high conductivity, respectively.

6. A repetitive-linear-sweep-signal generator comprising: first and second series-coupled electron-discharge devices having variable-conductivity operating conditions; potential-divider bias-circuit means including a portion coupled in series with said devices for maintaining said first device in a condition of low conductivity during high-conductivity intervals of said second device; control-circuit means including said bias-circuit means for repetitively increasing the conductivity of said first device; circuit means coupled to said first and second devices for maintaining said second device in a condition of low conductivity during intervals of increased conductivity of said first device and responsive to said increased conductivity for developing a substantially linear-sweep signal; and signal-magnitude-limiting means coupled to said first and second devices and responsive to the sweep trace of said sweep signal for limiting the sweep range of said sweep signal to restore said first and second devices to conditions of low and high conductivity, respectively.

7. A repetitive-linear-sweep-signal generator comprising: first and second signal-responsive circuit means having variable-conductivity operating conditions; bias-circuit means coupled thereto for maintaining said first circuit means in a condition of low conductivity during high-conductivity intervals of said second circuit means; a repetitive-trigger-pulse-supply circuit including said bias-circuit means for repetitively triggering said first circuit means to increase the conductivity thereof; circuit means coupled to said first and second circuit means for maintaining said second circuit means in a condition of low conductivity during intervals of increased conductivity of said first circuit means and responsive to said increased conductivity for developing a substantially linear-sweep signal; and signal-magnitude-limiting means coupled to said first and second circuit means and responsive to the sweep trace of said sweep signal for limiting the sweep range of said sweep signal to restore said first and second circuit means to conditions of low and high conductivity, respectively.

8. A repetitive-linear-sweep-signal generator comprising: first and second signal-responsive circuit means having variable-conductivity operating conditions; bias-circuit means coupled thereto for maintaining said first circuit means in a condition of low conductivity during high-conductivity intervals of said second circuit means; control-circuit means including said bias-circuit means for repetitively increasing the conductivity of said first circuit means; a resistor-condenser time-constant network coupled between said first and second circuit means for maintaining said second circuit means in a condition of low conductivity during intervals of increased conductivity of said first circuit means and responsive to said increased conductivity for controlling the conductivity of said second circuit means to maintain a substantially constant current flow through a condenser of said network and thus to develop a substantially linear-sweep signal; and signal-magnitude-limiting means coupled to said first and second circuit means and responsive to the sweep trace of said sweep signal for limiting the sweep range of said sweep signal to restore said first and second circuit means to conditions of low and high conductivity, respectively.

9. A repetitive-linear-sweep-signal generator comprising: first and second signal-responsive circuit means having variable-conductivity operating conditions; bias-circuit means coupled thereto for maintaining said first circuit means in a condition of low conductivity during high-conductivity intervals of said second circuit means; control-circuit means including said bias-circuit means for repetitively increasing the conductivity of said first circuit means; circuit means coupled to said first and second circuit means for maintaining said second circuit means in a condition of low conductivity during intervals of increased conductivity of said first circuit means and responsive to said increased conductivity for developing a substantially linear-sweep signal; and a signal-magnitude-limiting diode included in said bias-circuit means and maintained conductive thereby during said high-conductivity intervals of said second circuit means but maintained nonconductive by said bias-circuit means and said first circuit means during said low-conductivity intervals of said second circuit means and responsive to the sweep trace of said sweep signal for limiting the sweep range of said sweep signal to restore said first and second circuit means to conditions of low and high conductivity, respectively.

References Cited in the file of this patent

UNITED STATES PATENTS

| | | |
|---|---|---|
| 2,417,286 | Bartels | Mar. 11, 1947 |
| 2,489,312 | Pacini | Nov. 29, 1949 |
| 2,562,295 | Chance | July 31, 1951 |
| 2,597,092 | Fyler | May 20, 1952 |
| 2,627,025 | Trembly | Jan. 27, 1953 |
| 2,728,028 | Carpenter | Dec. 20, 1955 |
| 2,772,356 | Rich | Nov. 27, 1956 |

FOREIGN PATENTS

| | | |
|---|---|---|
| 601,675 | Great Britain | May 11, 1948 |

OTHER REFERENCES

"A Rapid Flyback Miller Time-Base Circuit," by Fraser; Electronic Engineering, vol. 26, issue 312, February 1954, page 71.

"Linear Saw-Tooth Generators," by Keen; Wireless Engineer, July 1948, pages 210–214.